United States Patent Office 3,532,764
Patented Oct. 6, 1970

3,532,764
DIMERISATION PROCESS
James Keith Hambling, Frimley, near Aldershot, and John Robert Jones, Walton-on-Thames, England, assignors to The British Petroleum Company Limited, London, England, a corporation of England
No Drawing. Filed Dec. 28, 1966, Ser. No. 605,193
Claims priority, application Great Britain, Jan. 7, 1966, 813/66
Int. Cl. C07c $3/18$
U.S. Cl. 260—683.15                                       9 Claims

ABSTRACT OF THE DISCLOSURE

Olefin dimerisation process comprises contacting an alpha olefin with the reaction product of a reducible salt of a metal of Group IB or VIII and a reducing agent in the presence of a methylene halide at a temperature in the range $-40°$ to $+200°$ C. under such conditions of pressure that the reactants are maintained in the liquid or partially condensed phase. The presence of the methylene halide considerably increases the yield of product obtained.

In an example, 2.6 g. cobalt chloride were slurried in 15 g. methylene dichloride and 5.0 cc. diethyl aluminium chloride were added. The mixture was transferred to an autoclave, heated to 100° C. and cooled to 40° C. It was then pressurised with liquid propylene to 600 p.s.i.g. and rocked for 1 hour. 55 g. hexenes containing 33.2% linear hexenes were obtained.

---

This invention relates to a process for the production of dimers of alpha olefins.

Our copending and now abandoned United States application Ser. No. 559,096, filed June 21, 1966, discloses a process for the production of a product consisting predominantly of branched chain dimers having internal unsaturation and linear dimers which process comprises dimerising an alpha olefin containing three or more carmon atoms per molecule in the presence of a catalyst comprising the reaction product of a reducible salt of a metal of Group Ib or VIII of the Periodic Table according to Mendeleef and a reducing agent at a temperature in the range $-40°$ C. to $+200°$ C. under such conditions of pressure that the reactants are maintained in the liquid or partially condensed phase.

We have now discovered that the additional presence of a methylene halide considerably increases the yield of product obtained from such a process.

Thus according to the present invention there is provided a process for the production of a product consisting predominantly of branched chain dimers having internal unsaturation and linear dimers which process comprises dimerising an alpha olefin in the presence of a catalyst comprising the reaction product of a reducible salt of a metal of Group Ib or VIII of the Periodic Table according to Mendeleef and a reducing agent and in the presence of a methylene halide at a temperature in the range $-40°$ C. to $+200°$ C. under such conditions of pressure that the reactants are maintained in the liquid or partially condensed phase.

Preferred reducible salts include cobalt chloride, and nickel chloride.

Suitable reducing agents include Grignard reagents, metal alkyls and similar organo-metallic compounds and metal hydrides.

The preferred reducing agents are organo-aluminium compounds, in particular, aluminiumdiethyl monochloride and aluminium triethyl.

The preferred methylene halide is methylene chloride.

Preferably the molar ratio of the salt to the reducing compound is in the range 2:1 to 1:10.

In general, it will be found that the salt will not react with the reducing agent at ambient temperatures and that the mixture will require heating before becoming catalytically active.

Preferably the salt and the reducing compound are heated to a temperature in the range 40° to 180° C. before contacted with the alpha-olefin to be dimerised.

The salt and the reducing compound are preferably heated in the presence of the methylene halide.

Alternatively, they may be heated in the presence of an inert diluent, e.g., a saturated hydrocarbon or benzene, and the methylene halide added subsequently.

Alternatively, if activated carbon is present the composition is rendered catalytically active at lower temperatures, including sometimes room temperature. A dimerisation process employing a catalyst comprising a reducible salt of a metal of Group I or VIII of the Periodic Table and a reducing agent supported on an activated carbon support is described in our copending United States application Ser. No. 559,399, filed June 22, 1966, Pat. 3,465,-056.

Suitable olefins for dimerisation include those containing from 2–6 carbon atoms per molecule.

Preferred olefins for dimerisation are ethylene, propylene and butene-1.

Preferably the pressure under which dimerisation is effected is in the range 200 to 2000 p.s.i.g. for ethylene, propylene and butene-1.

Pressures as low as atmospheric may be used for the dimerisation of higher alpha olefins, e.g., 3-methylpentene-1 and 4-methylpentene-1.

Since the catalyst is obtained in solution form no further diluent is necessary for the dimerisation reaction. Dimerisation may, however, if desired, be effected in the additional presence of an inert diluent. Suitable diluents again include saturated hydrocarbons and benzene.

The catalyst must be preserved from contact with water, oxygen alcohols, ethers, amines, phosphines, sulphur compounds, dienes, acetylenes, carbon monoxide and other complexing ligands which displace olefins from transition metal complexes and thereby poison the catalyst or inhibit polymerisation.

The invention is illustrated with reference to the following examples.

It is to be understood that Example 1 is provided for purposes of comparison only and is not a process within the scope of the present invention.

EXAMPLE 1

6.5 cc. aluminium diethyl monochloride were added drop-wise with intermittent shaking to a suspension of 3.3 g. $CoCl_2$ in 25 cc. n-heptane at 0° C. under an atmosphere of dry, oxygen-free nitrogen. The mixture was gradually warmed to 100° C. with stirring. Reaction between the components was indicated by the fact that the mixture turned black. The reaction product was then cooled under nitrogen and transferred to a one litre stainless steel rocking autoclave which was then pressurised with propylene at 600 p.s.i.g. and 40° C. The total reaction products were collected in cooled traps (solid carbon dioxide/acetone) after a reaction period of 16 hours. The excess propylene was allowed to evaporate slowly. The residual colourless liquid consisted of 344 g. hexenes and 10 g. higher boiling polymer. The hexenes contained 26.7% linear hexenes.

The activity of the catalyst was therefore 14.4 g. polymer/g. cobalt/hour.

EXAMPLE 2

2.6 g. cobalt chloride was slurried in 15 g. methylene dichloride and 5.0 cc. diethyl aluminium chloride were added at room temperature.

The mixture was then transferred under nitrogen to a 1 litre autoclave. The autoclave was closed, heated to 100° C. for one hour and then cooled to 40° C. It was next pressurised with liquid propylene to 600 p.s.i.g. and rocked for one hour during which time the temperature rose to 66° C. without applied heating. Analysis of the product showed the presence of 55 g. hexenes and 130 g. higher boiling liquid polymer. The hexenes contained 33.2% linear hexenes.

The activity of the catalyst was therefore 157 g. polymer/g. cobalt/hour.

EXAMPLE 3

Steam activated coconut shall charcoal (Grade Utrasorb SCII 8–12 mesh) (100 g.) was added to a solution of 200 g. cobalt chloride hexahydrate in 70 cc. distilled water at room temperature. After standing with occasional stirring for half an hour the solid was filtered off and allowed to stand in air to dry. It was then heated in a slow stream of nitrogen at 300° C. for 4 hours to remove all combined water. The solid contained 39% weight cobalt chloride ($CoCl_2$). Part of this solid (12.5 g.) was slurried in 35 cc. dry methylene chloride at 20° C. while 10 cc. aluminium diethyl chloride was added dropwise during half an hour, the whole operation being conducted in an atmosphere of dry nitrogen. The mixture was transferred under dry nitrogen to a 1 litre autoclave. Liquid propylene was pressurised into the autoclave at 600 p.s.i. The autoclave was rocked for 4 hours while the temperature was maintained at 40° C. Products were then vented off and condensed in cooled traps (solid carbon dioxide-acetone). Unconverted propylene was allowed to evaporate at room temperature leaving a product which in addition to methylene dichloride and catalyst residues contained 165 g. polymer of which 87% was hexenes. The hexene fraction consisted of 19% linear hexenes, 80% methylpentenes and 1% dimethylbutenes.

What we claim is:

1. A process which comprises dimerising alpha mono-olefins containing 2–6 carbon atoms per molecule in the presence of methylene chloride and a catalyst consisting essentially of a mixture of a reducible salt selected from the group consisting of cobalt chloride and nickel chloride, a reducing agent selected from the group consisting of aluminium trialkyls and aluminium alkyl halides and methylene chloride, said catalyst having been obtained by heating said mixture to a temperature in the range of 40° to 180° C. before being contacted with said olefins to be dimerised, dimerisation being effected at a temperature in the range —40° to 200° C. under such conditions of pressure that the reactants are maintained in the liquid or partially condensed phase.

2. A process as defined in claim 1 wherein said alpha mono-olefin is ethylene.

3. A process according to claim 1 wherein the reducing agent is selected from the group consisting of aluminium diethyl monochloride and aluminum triethyl.

4. A process according to claim 1 wherein the molar ratio of the salt to the reducing compound is in the range 2:1 to 1:10.

5. A process according to claim 1 wherein the alpha olefin contains from 3–6 carbon atoms per molecule.

6. A process according to claim 5 wherein the alpha olefin is selected from the group consisting of propylene and butene-1.

7. A process according to claim 6 wherein the pressure under which dimerisation is effected is in the range 200–2000 p.s.i.g.

8. A process according to claim 5 wherein the alpha olefin is selected from the group consisting of 3-methylpentene-1 and 4-methylpentene-1.

9. A process according to claim 8 wherein the pressure under which dimerisation is effected is atmospheric.

References Cited
UNITED STATES PATENTS 3,306,948 2/1967 Kealy.
3,397,194 8/1968 Swift _____ 260—683.15 X
3,452,115 6/1969 Schneider.

PAUL M. COUGHLAN, Jr., Primary Examiner

U.S. Cl. X.R.

252—429